(12) United States Patent
Boone

(10) Patent No.: US 7,108,875 B2
(45) Date of Patent: Sep. 19, 2006

(54) COMPOSITION AND METHOD FOR PREPARING BASIC QUARK AND FURTHER PROCESSING OF THE BASIC QUARK

(75) Inventor: Marc Boone, Oedelem (BE)

(73) Assignee: Büllinger Bütterei, Bullange (BE)

( * ) Notice: Subject to any disclaimer, the term of this patent is extended or adjusted under 35 U.S.C. 154(b) by 584 days.

(21) Appl. No.: 10/257,764

(22) PCT Filed: Apr. 17, 2001

(86) PCT No.: PCT/EP01/04359

§ 371 (c)(1),
(2), (4) Date: Oct. 17, 2002

(87) PCT Pub. No.: WO01/78518

PCT Pub. Date: Oct. 25, 2001

(65) Prior Publication Data

US 2003/0091689 A1    May 15, 2003

(51) Int. Cl.
*A23C 9/12* (2006.01)
(52) U.S. Cl. ............... 426/34; 426/42; 426/43; 426/580; 426/583
(58) Field of Classification Search ............... 426/34, 426/42, 43, 580, 583, 582, 581
See application file for complete search history.

(56) References Cited

FOREIGN PATENT DOCUMENTS

| CA | 2116521 | 8/1995 |
| WO | WO01/15541 | 3/2001 |

OTHER PUBLICATIONS

J. Pien; *Les Utilisations du barbuerre: Le fromage du barbuerre*; La Technique laitiere, No. 901, p. 11, 13 XP000974902; p. 13, Col. 1-2 (with English translation).

Anon.; *Recent Advances on Production of Cheese from Buffalo's Milk in India*; Indian Dairyman, India Dairy Science Ass'n., Bangalore, In; vol. 22, No. 4, pp. 103-108; XP000974891).

Anon.; *Kaas uit karnemilk*; Zuivelbereiding en Handel; vol. 38 No. 47; (1933); p. 4 (with English translation) XP 002138766.

J. Korolczhuk; *Rheological properties of fresh cheeses. 1. Strees evolution during compression*; Milchwissenschaft, vol. 50, No. 12; pp. 674-678 XP 002182254.

Lee et al.; *Evaluation of cheese texture*; Journal of Food Science, vol. 43, No. 5; 1978; pp. 1600-1605; XP 001040927.

J.M.Buch Kristensen; *Fremstilling af kaernemaelksost*; MAELKERITIDENDE, vol. 85, 1972, pp. 1319-1320; XP 000911189 (with English translation).

M. Schultz; *Milchkundliches Speisen Lexicon*; Volkswirtschaftlicher Verlag, pp. 88-89; 1981; Munich, DE; XP 002138768 (with English translation).

M.Schultz; *Milchkundliches Speisen Lexicon*; Volkswirtschaftlicher Verlag; pp. 672-674; 1981; Munich, DE; XP 002157452 (with English translation).

E. Spreer; *Buttermilchquark*; Item 7.4.3; "Technologie der Milchverarbeitung" 1974; VEB Fachbuchverlag, Leipzig, DE XP 002138767 (with English translation).

*Primary Examiner*—Leslie Wong
(74) *Attorney, Agent, or Firm*—James Creighton Wray

(57) ABSTRACT

The invention relates to a composition and a method for preparing a basic quark, originating from "sweet" buttermilk, with a pH of 6.6 or higher, obtained from the preparation of butter originating from non-acidulated cream. The sweet buttermilk is pasteurised and cooled, after which acidulation culture and coagulant is added. The mixture is ripened and heated after which the product obtained is separated into quark and whey. The basic quark has a fat content below 2 wt. %, a phospholipid content ranging from 20 to 35% in comparison with the fat content, whereby the sphingolipid content lies between 10 and 30% in comparison with the phospholipid content. The invention also relates to a further processing of the basic quark for the production of a cream sauce base and/or a cream sauce with a fat content of less than 20 wt. %, obtained by adding cream to the basic quark.

4 Claims, 4 Drawing Sheets

US 7,108,875 B2

COMPOSITION AND METHOD FOR PREPARING BASIC QUARK AND FURTHER PROCESSING OF THE BASIC QUARK

This application claims the benefit of Belgian Application No. 2000/0278 filed Apr. 17, 2000 and PCT/EP01/04359 filed Apr. 17, 2001.

BACKGROUND OF THE INVENTION

The invention relates to a new composition of a basic quark, originating from buttermilk, and a particular method for preparing this basic quark.

Quark is fresh unpickled cheese, whereby the same coagulant is used as with the production of cheese, but with this difference that much less coagulant is used and that the ripening process is much short, with the result that quark can never become as hard as cheese. The quark develops by adding coagulant to milk products, among others skimmed milk or whole milk, or derivatives of milk products, such as buttermilk (both sour and sweet buttermilk), and allowing these to ripen, after which the mixture is separated into quark and whey.

In the state-of-the-art at present it has already been stated that semi-skimmed quark is particularly suitable for processing into various dishes (use as "basic quark"). The disadvantage of this semi-skimmed quark as basic quark is that this has a high fat content, since this semi-skimmed quark is made from semi-skimmed milk.

SUMMARY OF THE INVENTION

The purpose of this invention is to provide a basic quark, such as has been described in the first paragraph of the specification, but with a fat content below 2 wt. %, preferably ranging from 0.5 to 1.0 wt. %.

"Sweet" buttermilk, with a pH of 6.6 or higher, obtained from the preparation of butter originating from non-acidulated cream, is after pasteurisation cooled to a temperature from 22 to 24° C. The aforementioned pasteurisation takes place for a period of 2 to 4 minutes at a temperature from 82 to 85° C. Thereafter acidulation culture and coagulant or "rennet" are added. The acidulation culture can comprise one or more of the *Streptococcus lactis, Streptococcus cremoris, Streptococcus diacetyllactis* and *Leuconostoc citrovorum* cultures. The mixture is ripened for a period of 12 to 16 hours to a pH ranging from 4.0 to 4.7, preferably from 4.5 to 4.6, and thereafter heated for a period from 60 to 65 minutes at a temperature ranging from 45 to 50° C., after which the product obtained is separated into quark and whey.

The basic quark derived from sweet buttermilk has good microtextural properties and exhibits a favourable macroscopic breaking behaviour (=stress that is necessary for breaking the product, "gumminess", "springiness"). The basic quark moreover has a rigidity modulus, measured by the penetration test, ranging from 39000 Pa to 73000 Pa. This has the advantage that the cheese is a very soft cheese. The basic quark has an adhesive force, measured by the adhesion test, ranging from 0.035 N to 0.045 N. This has the advantage that the cheese has a great smoothness.

DETAILED DESCRIPTION OF THE PREFERRED EMBODIMENTS

The basic quark further has a fat content ranging from 0.5 wt. % to 1.0 wt. %, of which 20 to 35% phospholipids that in their turn comprise 10 to 30% sphingolipids.

Sphingolipids are apart from lecithin, membrane lipids and similar, a type of phospholipids. It is known that sphingolipids are fatty substances that are on the surface of the cells of mammals. Up to now a few functions of these sphingolipids have been discovered namely that they are apparently actively involved with the renewal of cells through their regulation of cell growth and cell death; that they can possibly have an influence on the growth of (tumour) cells, since they handle the transfer of signals from outside the cell (through e.g. growth regulating proteins) to the interior of the cell; and that they could play a role in immunology because they are bactericidal. They have a positive effect on both the exterior (among others the skin) and the interior of the body.

The invention also relates to a further processing of the basic quark, more specifically the processing of basic quark into a new type of low-fat cream sauce base and/or cream sauce.

The state-of-the-art at present in this respect includes sauces on the basis of yoghurt or on the basis of cream, sour cream, or a sour milk product mixed with additives such as among others starch.

Thus in the French patent no. 2623376 a sauce on the basis of yoghurt is considered, whereby the sauce contains more than 5% yoghurt and there is no oil in it. The other ingredients can be fresh cream and/or soft white cheese, and products that are found in the composition of classic sauces such as salt, mustard, vinegar, stabiliser, water, spices, fine herbs, etc. The preferred composition consists of 20% yoghurt, 30% cream and 30% soft white cheese. If a sauce is desired with a low energy content, then it is possible to take 30% yoghurt and 40% soft white cheese with a low fat content.

In the German patent application no. 334822 a sauce binder is considered based on sour cream, cream or sour milk, whereby a predetermined amount of ungelatinised natural or modified starch is mixed with sour cream such as for example fresh cream, a cream or milk product. The starch/sour cream, cream or sour milk ratio can rise to 50/50. In order to achieve stabilisation cold-soluble thickening agents or hydrocolloids are added prior to the pasteurisation in a ratio of 0.2 to 0.6%. Colouring agents and flavouring substances can furthermore also be added such as among others caramel colouring and herbs.

The purpose of this invention is to provide a base for sauces and/or sauce with a typical cream taste that is obtained by adding an amount of cream to the basic quark until a fat content is obtained of maximum 20 wt. %, preferably ranging from 5 to 10 wt. %.

For the production of the cream sauce base the cream can be added to the basic quark by means of a monomix.

Since the fat content of the basic quark lies so low, it is possible to add more cream in order thus to obtain a better cream taste in the sauce base and/or sauce and nevertheless obtain a product that has a relatively low fat content. In addition, the more cream that is added, the further it can go in the heating process (if the cream sauce is used as hot sauce), without separating proteins in the cream sauce.

The addition of cream to the basic quark has the other advantage that, apart from the high percentage of sphingolipids that are already in the basic quark, the sphingolipid content is still raised by the concentration of sphingolipids that are in the added cream. A product of the "healthy food" range is thus obtained, whereby few fats are present in the products, but these fats are functional fats.

The characteristics and distinctive features of this invention are further explained below on the basis of an embodiment example, with reference to the attached drawings. It should be noted that specific aspects of this example are only described as preferred example of what is intended in the scope of the above general specification of the invention, and may in no way be interpreted as a restriction on the scope of the invention as such and as expressed in the following claims.

DETAILED DESCRIPTION OF THE PREFERRED EMBODIMENTS

In the concrete example of the method specified here for preparing basic quark and a cream sauce originating from the aforementioned basic quark according to the invention, is based on sweet buttermilk that has a pH of 6.6 or higher. The sweet buttermilk has the following composition:

| | |
|---|---|
| Dry matter (%) | 7.5 |
| Ash (%) | 0.71 |
| Protein (%) | 2.7 |
| Fat (%) | 0.3 |
| Carbohydrates (%) | 3.8 |
| Calorific value (kcal/100 g) | 28.7 |
| Fe (mg/kg) | 0.9 |
| Cu (mg/kg) | 0.08 |
| Zn (mg/kg) | 2.9 |
| Phospholipids (% of fat) | 42.3 |
| Phosphatidyl choline = lecithin (%) | 30 |

Figure 1:
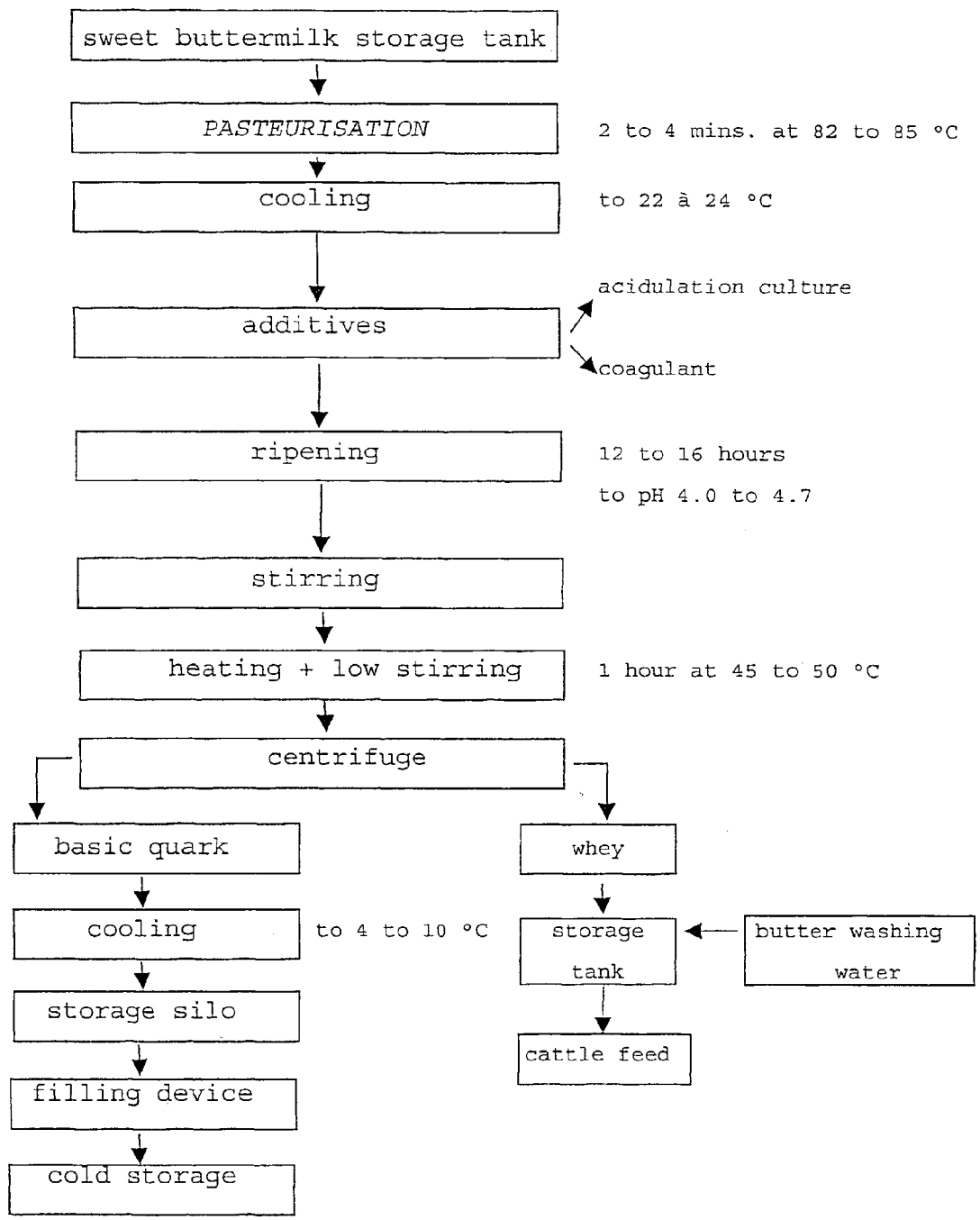
FIG. 1 is a schematic representation of the method according to the invention for preparing the basic quark originating from sweet buttermilk.
Figure 2:
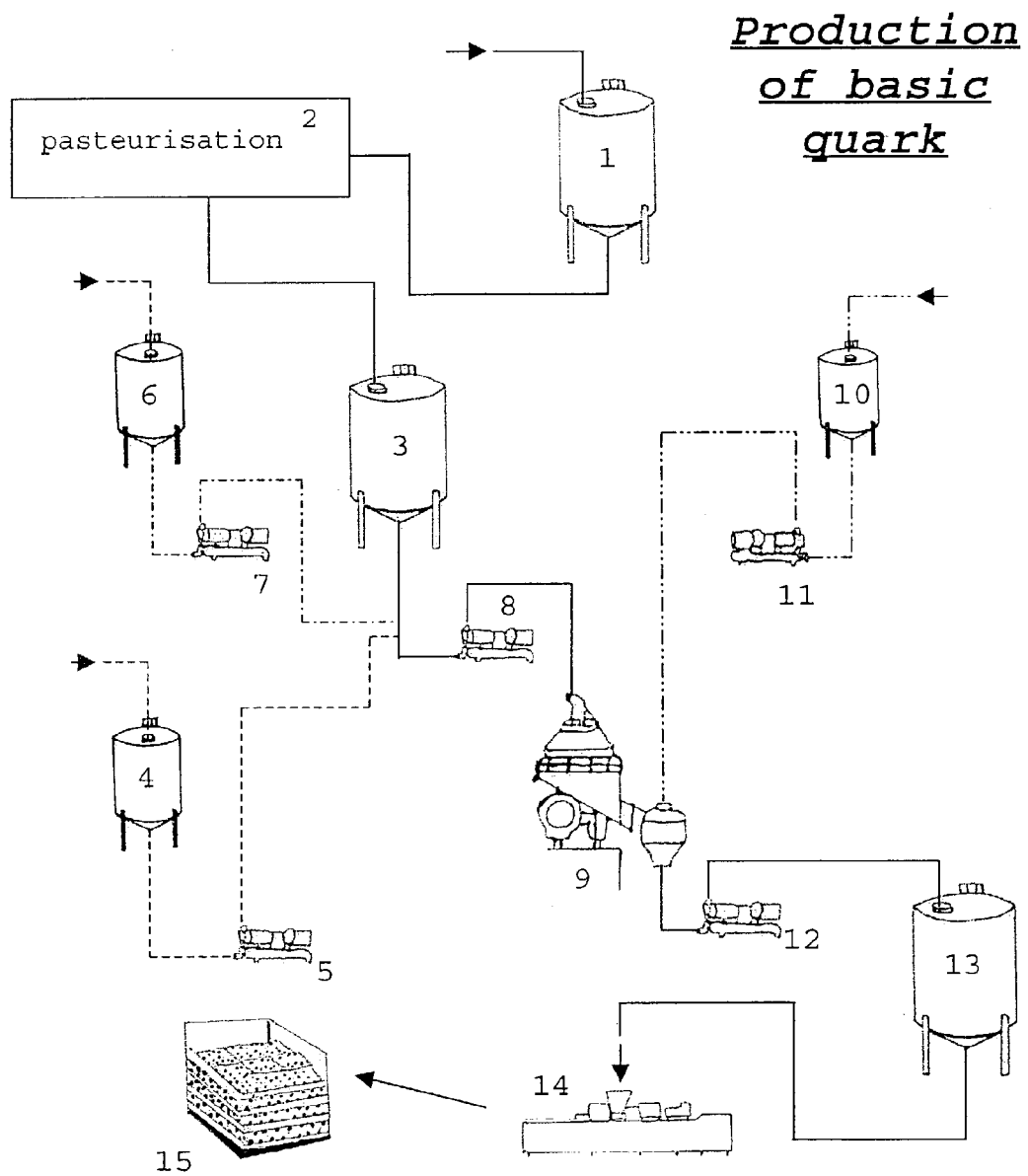
FIG. 2 is a schematic representation of a device according to the invention for preparing the basic quark originating from sweet buttermilk.

For the preparation of the basic quark, as shown in FIGS. 1 and 2, the sweet buttermilk from a storage tank (1) is first pasteurised (2). Pasteurisation is a process whereby each part of a milk product or a composition on the basis of a milk derivative is heated to a certain temperature, whereby this temperature is maintained for a certain period, in order thus to make the aforementioned milk product or the aforementioned composition on the basis of a milk derivative sufficiently pathogen-free or in other words to kill all known pathogenic microorganisms. In this invention the sweet buttermilk is heated for 2 to 4 minutes at 82 to 85° C. The pasteurised sweet buttermilk obtained here from is cooled in a tank (3) to 22 to 24° C. This temperature is ideal for the acidulation and the curdling of the sweet buttermilk. In order to acidulate the sweet buttermilk, 0.6 to 1% acidulation culture, stored in culture tank (6), is transferred via a metering pump (7) to the aforementioned storage tank (3), in which the cooled pasteurised sweet buttermilk is. Thereafter coagulant or "rennet", which is kept in a tank (4), is transferred in a ratio of 1:10000 via a metering pump (5) to the aforementioned storage tank (3), in order thus to allow the pasteurised buttermilk to ripen. Now starts the actual ripening and coagulation process of the sweet buttermilk. The sweet buttermilk is ripened for 14 to 16 hours in the aforementioned tank (3) until a pH of 4.0 to 4.7, preferably 4.5 to 4.6 is obtained. The mixture is stirred and thereafter while slowly stirring heated to a temperature of 45 to 50° C. The mixture is transferred via a pump (8) to a separator (9)—a centrifuge—where it is separated into quark and whey.

Possibly a mixture of *Lactobacillus acidophilus* culture and/or *Bifidobacterium bifidum* can be added from a culture tank (10), by means of a metering pump (11). A basic quark is thus obtained that can serve to be further processed into a number of end-products. The basic quark is pumped over to a storage silo (13) by means of a quark pump (12). From the aforementioned silo the basic quark can be transferred to the filling device (14) and thereafter stored in a cold-storage (15).

The whey that is obtained after centrifuging the mixture in the aforementioned centrifuge (9) can together with butter washing water be processed into cattle feed.

The basic quark obtained has on average the following properties and composition:

| | |
|---|---|
| Dry matter (%) | 15.1 |
| Ash (%) | 0.77 |
| Protein (%) | 9.1 |
| Fat (%) | 0.95 |
| Carbohydrates (%) | 3.6 |
| Calorific value (kcal/100 g) | 62.1 |
| Calorific value (kJ/100 g) | 263 |
| Fe (mg/kg) | 1.5 |
| Cu (mg/kg) | 0.04 |
| Zn (mg/kg) | 5.5 |
| Phospholipids (% of fat) | 24.3 |
| Sphingolipids (% of phospholipids) | 15 |

The basic quark obtained according to the invention has good microtextural properties and a favourable macroscopic breaking behaviour in comparison to other low-fat fresh cheeses.

The rigidity modulus is determined by a penetration test, whereby a cylindrical probe is pushed 1 am into the cheese at a speed of 30 mm/min. The rigidity modulus that is a measure for the hardness of the basic quark can be derived from the slope of the stress/strain curve obtained. The rigidity modulus of the basic quark is lower than that of most other low-fat fresh cheeses, through which the basic quark is softer than most other low-fat fresh cheeses.

EXAMPLE

| | Delhaize | GB | Danone | Basic quark |
|---|---|---|---|---|
| Rigidity modulus (Pa) | 158000–220000 | 296000–388000 | 132000–169000 | 39000–73000 |

The adhesive force is determined by an adhesion test, whereby a spherical probe is pushed 1 cm into the cheese at a speed of 30 mm/min. The resistance on withdrawing the probe is a measure of the gumminess or the smoothness of the basic quark. The adhesive force of the basic quark is greater than that of most other low-fat fresh cheeses, through which the basic quark is smoother than most other fresh low-fat cheeses.

EXAMPLE

|  | Delhaize | GB | Danone | Basic quark |
|---|---|---|---|---|
| Adhesive force (N) | 0.014–0.024 | 0.021–0.030 | 0.024–0.036 | 0.036–0.045 |

This basic quark is now further processed into a number of end-products. Through the addition of yoghurt cultures such as *Lactobacillus bulgaricus* and *Streptococcus thermophilus*, yoghurt can be made.

This invention especially concentrates on the preparation of a cream sauce base and/or cream sauce originating from the basic quark formed.

Figure 3:
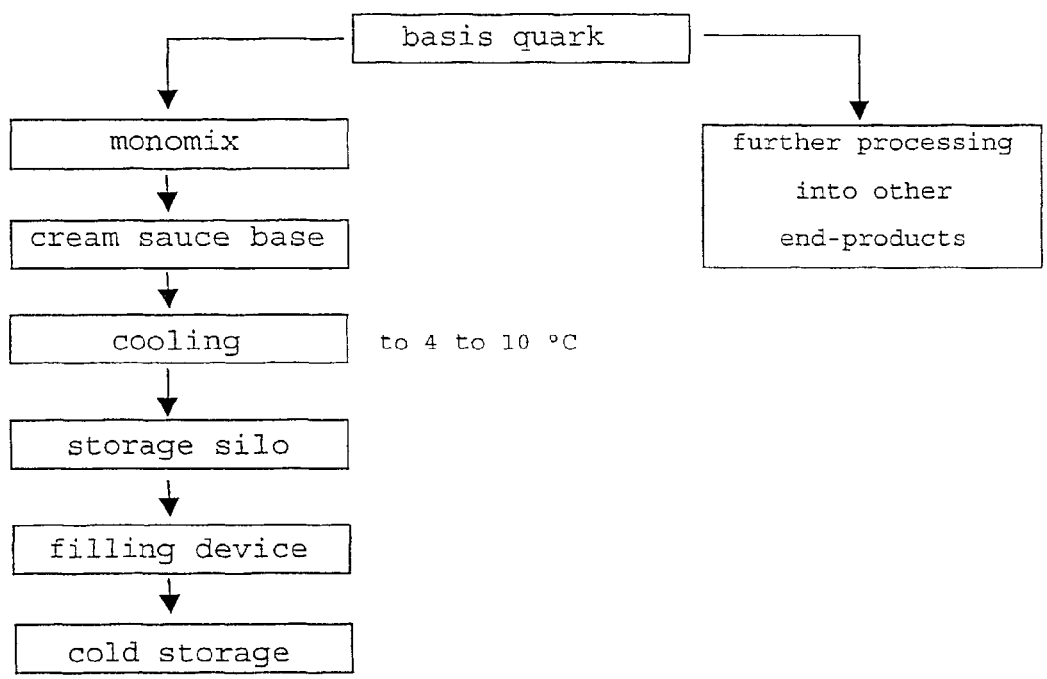
FIG. 3 is a schematic representation of the further processing method of the basic quark into cream sauce base and possibly other end-products.
Figure 4:
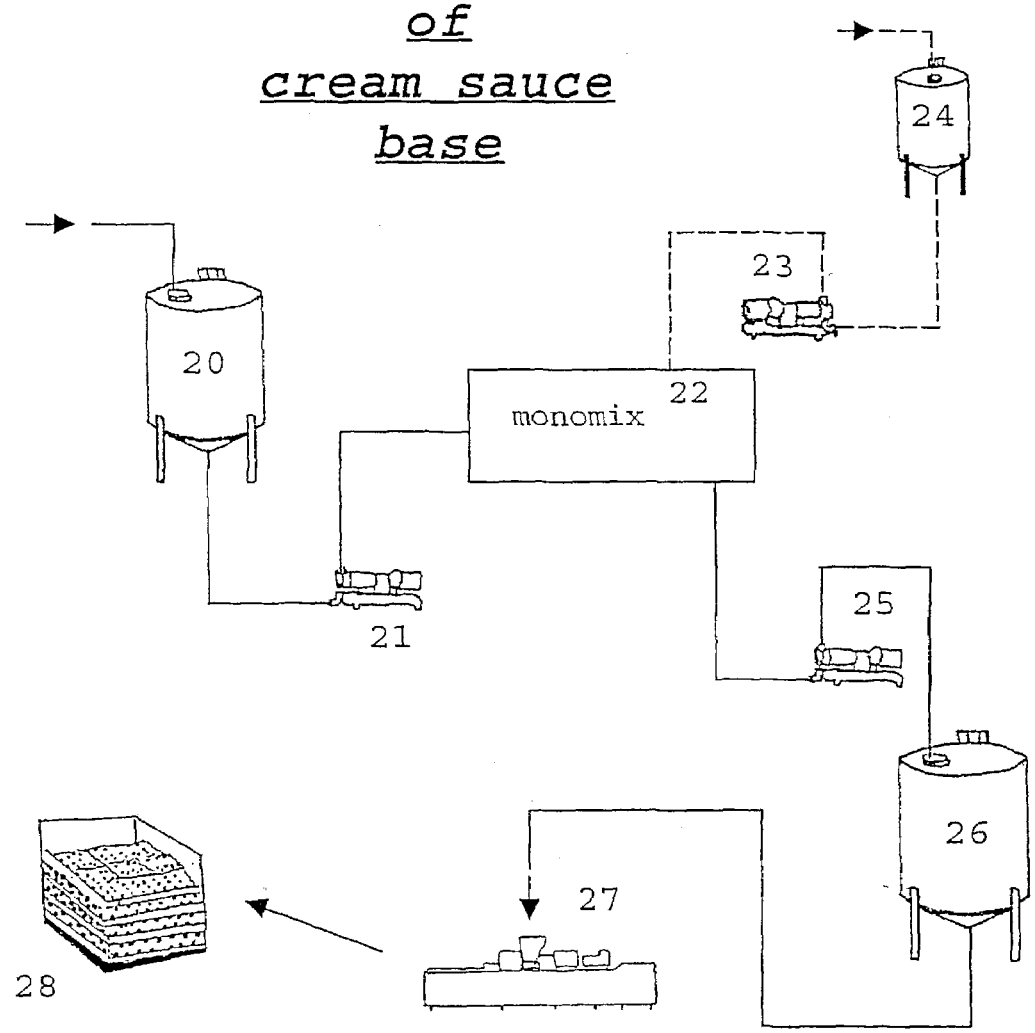
FIG. 4 is a schematic representation of a device for implementing the method for preparing cream sauce base originating from the basic quark.

For the preparation of the aforementioned cream sauce base, such as shown in FIGS. 3 and 4, the basic quark that is stored in a storage silo (20) is pumped over via a quark pump (21) to a monomix (22). In the aforementioned monomix (22) cream, stored in a tank (24), is added via a metering pump (23) until a cream sauce base is obtained with a fat content below 20 wt. %, preferably ranging from 5 to 10 wt. %. The now obtained cream sauce base is pumped over via a pump (25) to a storage silo (26), after which the aforementioned cream sauce base can be filled into a filling device (27) and be stored in a cold storage (28).

The cream sauce base can be used in various ways namely for hot sauces e.g. meats, or as dressing e.g. on salads.

The invention claimed is:

1. Method for preparing basic quark, originating from buttermilk, whereby the buttermilk is ripened and is subsequently separated into quark and whey, wherein "sweet" buttermilk, with a pH of 6.6 or higher, obtained from the preparation of butter originating from non-acidulated cream, after pasteurisation is cooled to a temperature from 22 to 24° C., after which acidulation culture and coagulant is added; this mixture is ripened for a period of 12 to 16 hours to a pH ranging from 4.0 to 4.7 and is thereafter heated for a period from 60 to 65 minutes at a temperature ranging from 45 to 50° C., after which the product obtained is separated into quark and whey.

2. Method according to claim 1, wherein said pasteurisation takes place for a period of 2 to 4 minutes at a temperature from 82 to 85° C.

3. Method according to claim 1, wherein the sweet buttermilk is acidulated to a pH ranging from 4.5 to 4.6.

4. Method according to claim 3, wherein for the acidulation of the sweet buttermilk use is made of an acidulation culture that comprises one or more of the Streptococcus lactis, Streptococcus cremoris, Streptococcus diacetyllactis and Leuconostoc citrovorum cultures.

* * * * *